United States Patent [19]
Eleam

[11] Patent Number: 6,135,332
[45] Date of Patent: Oct. 24, 2000

[54] COLLAPSIBLE STORAGE BASKET

[76] Inventor: Linda A. Eleam, 1367 Montezuma St., Pittsburgh, Pa. 15206-1811

[21] Appl. No.: 09/234,656

[22] Filed: Jan. 21, 1999

[51] Int. Cl.⁷ ...................................................... B60R 7/00
[52] U.S. Cl. ................... 224/275; 224/42.32; 224/42.34; 224/548; 224/549; 224/925
[58] Field of Search ................ 224/275, 42.32, 224/42.33, 42.34, 548, 549, 925; 220/6, 7, 4.28; 211/195, 132.1, 132.2

[56] References Cited

U.S. PATENT DOCUMENTS

| | | | |
|---|---|---|---|
| D. 285,885 | 9/1986 | Cusenza et al. | D6/512 |
| 3,314,549 | 4/1967 | Goldreich et al. | 108/69 |
| 3,848,748 | 11/1974 | Ceccarelli | 211/195 |
| 4,029,244 | 6/1977 | Roberts | 224/42.34 |
| 4,305,519 | 12/1981 | Gerich | 220/7 |
| 4,526,285 | 7/1985 | Cerueny et al. | |
| 5,492,287 | 2/1996 | Demick | 224/275 |

*Primary Examiner*—Gregory M. Vidovich
*Assistant Examiner*—Maerena W. Brevard

[57] ABSTRACT

A collapsible storage basket for coupling to a seat back of a motor vehicle. The collapsible storage basket includes opposite side panels and a pair of end panels extending between the side panels. Lower edges of each of the side and end panels are pivotally coupled to a rear surface of a back portion of a seat. The side and end panels are positionable between a deployed position and a retracted position. The panels are oriented generally perpendicular the rear surface of the back portion of the seat when the panels are in the deployed position. The panels are oriented generally parallel the rear surface of the back portion of the seat when the panels are in the retracted position.

16 Claims, 2 Drawing Sheets

COLLAPSIBLE STORAGE BASKET

BACKGROUND OF THE INVENTION

1. Field of the Invention

The present invention relates to collapsible receptacles and more particularly pertains to a new collapsible storage basket for coupling to a seat back of a motor vehicle for holding items when erect and the seat is in a down position.

2. Description of the Prior Art

The use of collapsible receptacles is known in the prior art. More specifically, collapsible receptacles heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,305,519; U.S. Pat. No. 4,029,244; U.S. Pat. No. 5,492,257; U.S. Pat. No. 3,848,748; U.S. Pat. No. 3,314,549; and U.S. Pat. No. Des. 285,885.

While these devices fulfill their respective, particular objectives and requirements, the aforementioned patents do not disclose a new collapsible storage basket. The inventive device includes opposite side panels and a pair of end panels extending between the side panels. Lower edges of each of the side and end panels are pivotally coupled to a rear surface of a back portion of a seat. The side and end panels are positionable between a deployed position and a retracted position. The panels are oriented generally perpendicular the rear surface of the back portion of the seat when the panels are in the deployed position. The panels are oriented generally parallel the rear surface of the back portion of the seat when the panels are in the deployed position.

In these respects, the collapsible storage basket according to the present invention substantially departs from the conventional concepts and designs of the prior art, and in so doing provides an apparatus primarily developed for the purpose of coupling to a seat back of a motor vehicle.

SUMMARY OF THE INVENTION

In view of the foregoing disadvantages inherent in the known types of collapsible receptacles now present in the prior art, the present invention provides a new collapsible storage basket construction wherein the same can be utilized for coupling to a seat back of a motor vehicle.

The general purpose of the present invention, which will be described subsequently in greater detail, is to provide a new collapsible storage basket apparatus and method which has many of the advantages of the collapsible receptacles mentioned heretofore and many novel features that result in a new collapsible storage basket which is not anticipated, rendered obvious, suggested, or even implied by any of the prior art collapsible receptacles, either alone or in any combination thereof.

To attain this, the present invention generally comprises opposite side panels and a pair of end panels extending between the side panels. Lower edges of each of the side and end panels are pivotally coupled to a rear surface of a back portion of a seat. The side and end panels are positionable between a deployed position and a retracted position. The panels are oriented generally perpendicular the rear surface of the back portion of the seat when the panels are in the deployed position. The panels are oriented generally parallel the rear surface of the back portion of the seat when the panels are in the retracted position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new collapsible storage basket apparatus and method which has many of the advantages of the collapsible receptacles mentioned heretofore and many novel features that result in a new collapsible storage basket which is not anticipated, rendered obvious, suggested, or even implied by any of the prior art collapsible receptacles, either alone or in any combination thereof.

It is another object of the present invention to provide a new collapsible storage basket which may be easily and efficiently manufactured and marketed.

It is a further object of the present invention to provide a new collapsible storage basket which is of a durable and reliable construction.

An even further object of the present invention is to provide a new collapsible storage basket which is susceptible of a low cost of manufacture with regard to both materials and labor, and which accordingly is then susceptible of low prices of sale to the consuming public, thereby making such collapsible storage basket economically available to the buying public.

Still yet another object of the present invention is to provide a new collapsible storage basket which provides in the apparatuses and methods of the prior art some of the advantages thereof, while simultaneously overcoming some of the disadvantages normally associated therewith.

Still another object of the present invention is to provide a new collapsible storage basket for coupling to a seat back of a motor vehicle.

Yet another object of the present invention is to provide a new collapsible storage basket which includes opposite side panels and a pair of end panels extending between the side panels. Lower edges of each of the side and end panels are pivotally coupled to a rear surface of a back portion of a seat. The side and end panels are positionable between a deployed position and a retracted position. The panels are oriented generally perpendicular the rear surface of the back portion of the seat when the panels are in the deployed position. The panels are oriented generally parallel the rear surface of the back portion of the seat when the panels are in the deployed position.

Still yet another object of the present invention is to provide a new collapsible storage basket that functions as a storage receptacle in vehicles that do not have trunks, such as minivans and sport utility vehicles. Most such vehicles have a small area located behind the rear seat that serves as the trunk area. However, since the area is not enclosed, some items such as groceries, tools, or anything that would normally go in the trunk of a vehicle may slide around, where they may end up in front of the brake pedal or accelerator pedal. The collapsible storage basket overcomes this problem by utilizing the space wasted by the folded down seat by providing an enclosed space for the aforementioned items. The basket prevents the items from sliding around the interior of the vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
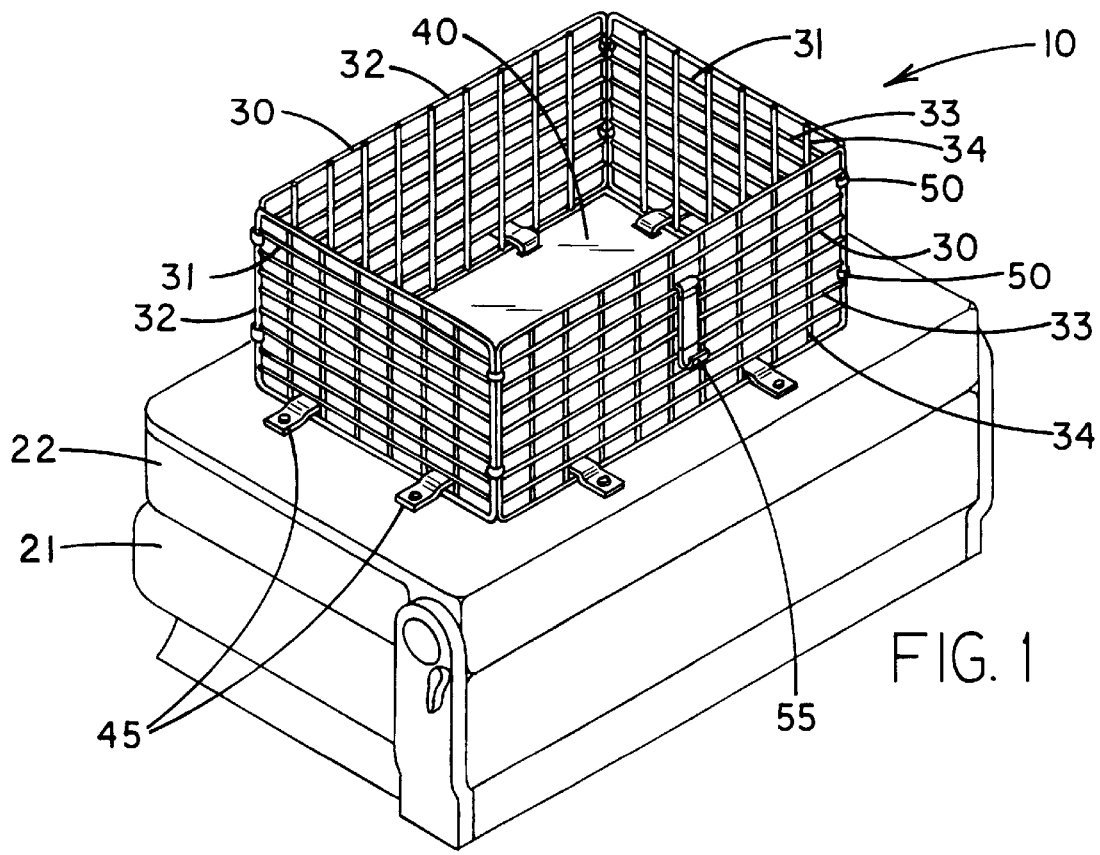
FIG. 1 is a schematic perspective view of a new collapsible storage basket in a deployed position according to the present invention.

With reference now to the drawings, and in particular to FIGS. 1 through 5 thereof, a new collapsible storage basket embodying the principles and concepts of the present invention and generally designated by the reference numeral 10 will be described.

As best illustrated in FIGS. 1 through 5, the collapsible storage basket 10 is adapted for coupling to a vehicle seat 20 with a seat portion 21 and a back portion 22 pivotally coupled to the seat portion. The back portion is positionable between an upright and a down position. The back portion is aligned generally perpendicular the seat portion when the back portion is in the upright position. The back portion is aligned generally parallel the seat portion when the back portion is in the down position.

Figure 2:
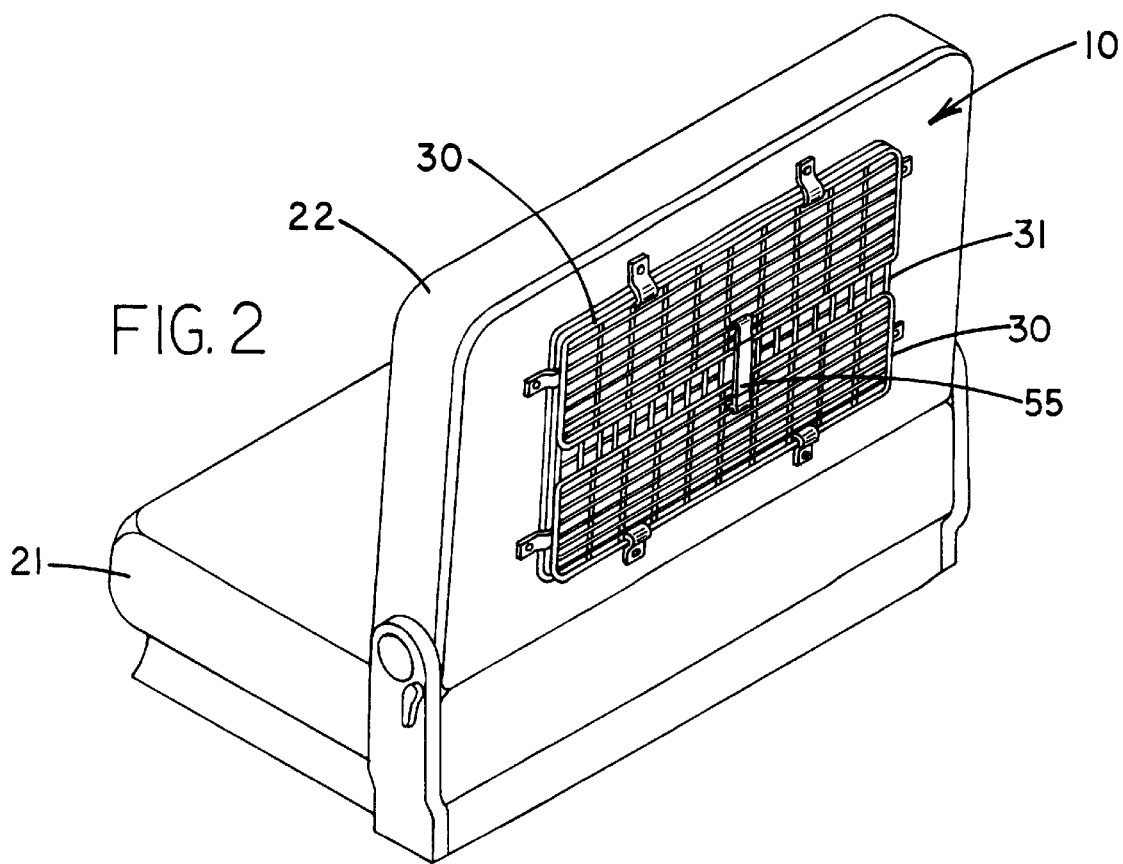
FIG. 2 is a schematic perspective view of the present invention in a collapsed position.

The storage basket generally comprises opposite side panels 30 and a pair of end panels 31 extending between the side panels. Lower edges of each of the side and end panels are pivotally coupled to a rear surface of the back portion of the seat. The side and end panels are positionable between a deployed position and a retracted position. As best shown in FIG. 1, the panels are oriented generally perpendicular the rear surface of the back portion of the seat when the panels are in the deployed position. As illustrated in FIG. 2, the panels are oriented generally parallel the rear surface of the back portion of the seat when the panels are in the retracted position. Ideally, the end panels are positioned between the side panels and the seat when the panels are in the retracted position.

Preferably, each of the side and end panels are generally rectangular and comprise stainless steel or high strength plastic for resistance to rusting when liquid from the items comes in contact with the panels.

Also preferably, each of the side and end panels of the storage basket has a peripheral ring 32 extending around it and a plurality of elongate horizontal and vertical cross members 33,34 extending across the peripheral ring in a welded rod configuration to permit visual identification of the contents held in the storage basket. Ideally, the cross members and the peripheral ring of the side and end panels each have a generally circular transverse cross section taken perpendicular to longitudinal axes thereof. Solid panels (not shown) may also be used. The panels may or may not be independently coupled to the bottom tray.

Preferably, a bottom tray 40 is disposed between the panels and the seat. Ideally, an outer periphery 41 of the bottom tray is disposed between the panels and the seat.

Figure 3:
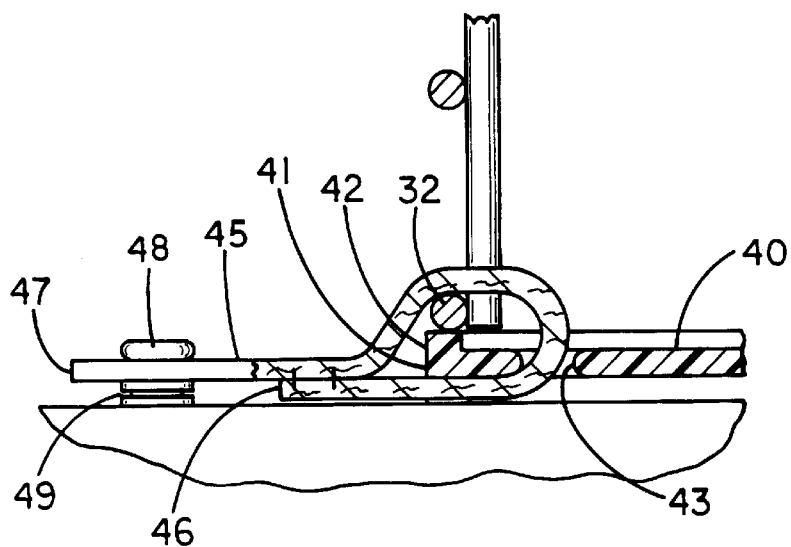
FIG. 3 is a schematic cross-sectional view of a fastener for coupling the panels of the present invention to the rear surface of the seat.

Ideally, as shown in FIG. 3, the bottom tray has a peripheral lip 42 outwardly extending from the outer periphery of the bottom tray in a direction away from the seat. The peripheral lip catches liquid, such as condensation running off of a cold food container, deposited in the bottom tray by the items held in the storage basket.

Also ideally, the bottom tray has a plurality of elongate slots 43 extending through it. Most ideally, the slots are positioned towards and oriented generally parallel the outer periphery of the bottom tray.

In the preferred embodiment, the panels are permanently coupled to the seat. Optionally, a plurality of straps 45 may couple the panels to the seat. In such an embodiment, each of the straps has opposite first and second ends 46,47. The first end of each of the straps is looped around one of the peripheral rings of the panels and through one of the slots of the bottom tray. The second end of each of the straps has a female portion of a snap type fastener 48 coupled to it.

A plurality of male portions of snap type fasteners 49 are coupled to the rear surface of the back portion of the seat. The male portions of the snap type fasteners of the seat are insertable in the female portions of the snap type fasteners of the straps to releasably couple the straps to the seat thereby coupling the storage basket to the seat. Snaps are the preferred fastener because they permit quick release of the basket from the seat. Alternative types of fasteners include hooks and loops fasteners (not shown) and buckles (not shown).

Ideally, each of the straps is deformable to permit pivoting of the panels with respect to the bottom tray. The importance of deformable straps is apparent from FIGS. 2 and 3, where it is seen that the pivoting of the panels will need to deform the straps to properly pivot. Also ideally, as best shown in FIG. 4, each of the slots has rounded edges to prevent wear on the straps.

Figure 4:
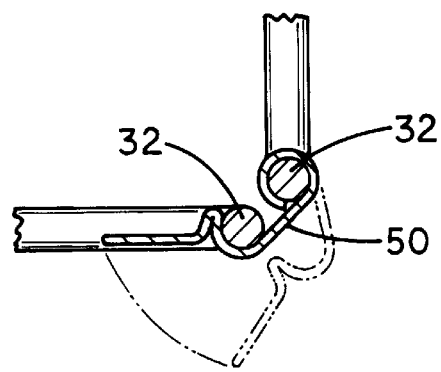
FIG. 4 is a schematic cross-sectional view of a spring clip for holding the panels of the present invention together in the deployed position.

Preferably, as shown in FIG. 4, a plurality of resiliently deformable spring clips 50 couple the peripheral rings of the panels together when the panels are in the deployed position. Ideally, as seen in FIG. 1, each of the peripheral rings of the side panels has four spring clips pivotally coupled to it. This permits ease in detaching the spring clips from the end panels for faster folding of the panels from the deployed position to the retracted position.

Figure 5:
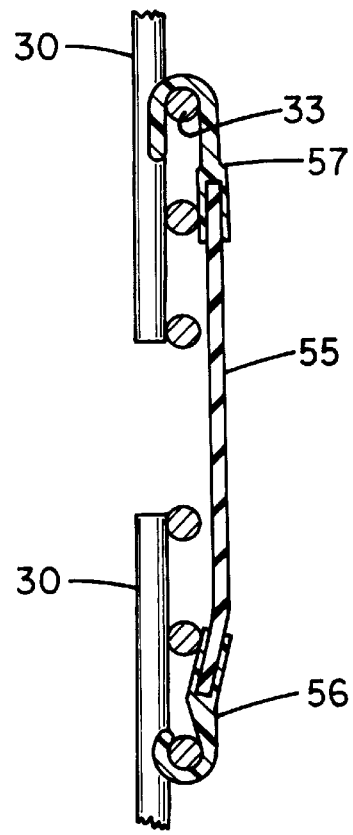
FIG. 5 is a schematic cross-sectional view of a tie down strap of the present invention for holding the panels in the collapsed position.

Also preferably, as illustrated in FIGS. 1, 2, and 5, a tie down strap 55 couples the side panels together when the panels are in the retracted position. The tie down strap has opposite ends. One of the ends has a resiliently deformable J-shaped clip 56 that is pivotally coupled to one of the horizontal members or the peripheral ring of one of the side panels. Another of the ends of the tie down strap has a U-shaped clip 57 that is coupleable to one of the horizontal members of another of the side panels.

Ideally, the J-shaped clip of the tie down strap is frictionally coupled to the horizontal member of the side panel such that it stays attached to the side panel when not in use, as shown in FIG. 2. Also ideally, the tie down strap is resiliently deformable (i.e., stretchable) between the ends of the tie down strap.

In use, the back portion of the seat is placed in the down position. The U-shaped clip of the tie down strap is detached and the panels are unfolded and placed in the deployed position. The spring clips are clipped onto the end panels to hold them in the deployed position and items are placed in the basket. When not in use, the basket may be folded up to conserve space. The spring clips are detached from the end panels and the end and side panels are folded in. The U-shaped clip of the tie down strap is reattached to the proper side panel to hold the panels in the retracted position. the back portion of the seat is placed in the upright position.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A collapsible storage receptacle for coupling to a vehicle seat having a seat portion and a back portion pivotally coupled to the seat portion, the back portion being positionable between an upright and a down position, the back portion being aligned generally perpendicular said seat portion when the back portion is in the upright position, the back portion being aligned generally parallel the seat portion when the back portion is in the down position, the collapsible storage receptacle comprising:

opposite side panels and a pair of end panels extending between said side panels, lower edges of each of said side and end panels including means for pivotally coupling to a rear surface of the back portion of the seat; and said side and end panels being positionable between a deployed position and a retracted position, said panels being oriented generally perpendicular said rear surface of said back portion of said seat when said panels are in said deployed position, said panels being oriented generally parallel said rear surface of said back portion of said seat when said panels are in said retracted position.

2. The collapsible storage receptacle of claim 1, wherein each of said side and end panels have a peripheral ring extending therearound and a plurality of elongate horizontal and vertical cross members extending across said peripheral ring.

3. The collapsible storage receptacle of claim 2, wherein said cross members and said peripheral ring of said side and end panels each have a generally circular transverse cross section taken perpendicular to longitudinal axes thereof.

4. The collapsible storage receptacle of claim 1, further comprising a bottom tray being disposed between said panels and said seat.

5. The collapsible storage receptacle of claim 4, wherein said bottom tray has an outer periphery, said outer periphery of said bottom tray being disposed between said panels and said seat.

6. The collapsible storage receptacle of claim 4, wherein said bottom tray has an outer periphery, said bottom tray having a peripheral lip outwardly extending from said outer periphery of said bottom tray.

7. The collapsible storage receptacle of claim 2, further comprising a plurality of straps for coupling said panels to said seat, each of said straps having opposite first and second ends, one said first end of each of said straps being looped around one of said peripheral rings of said panels and through said one of said slots of said bottom tray, said second end of each of said straps having a snap type fastener coupled thereto, a plurality of snap type fasteners being coupled to said rear surface of said back portion of said seat, said snap type fasteners of said seat being releasably coupleable to said snap type fasteners of said straps for releasably coupling said straps to said seat.

8. The collapsible storage receptacle of claim 4, wherein said bottom tray has a plurality of elongate slots extending therethrough, a plurality of straps for coupling said panels to said seat, each of said strap having opposite first and second ends, said first end of each of said straps being looped around one of said peripheral rings of said panels and through one of said slots of said bottom tray, said second end of each of said straps having a snap type fastener coupled thereto, a plurality of snap type fasteners being coupled to said rear surface of said back portion of said seat, said snap type fasteners of said seat being releasably coupleable to said snap type fasteners of said straps for releasably coupling said straps to said seat.

9. The collapsible storage receptacle of claim 7, wherein each of said straps is deformable.

10. The collapsible storage receptacle of claim 8, wherein each of said straps is deformable.

11. The collapsible storage receptacle of claim 1, further comprising a plurality of resiliently deformable spring clips for coupling said panels together when said panels are in said deployed position.

12. The collapsible storage receptacle of claim 2, wherein each of said peripheral rings of said side panels has four spring clips pivotally coupled thereto.

13. The collapsible storage receptacle of claim 1, wherein said end panels are positioned between said side panels and said seat when said panels are in said retracted position.

14. The collapsible storage receptacle of claim 1, further comprising a tie down strap for coupling said side panels together when said panels are in said retracted position.

15. The collapsible storage receptacle of claim 1, further comprising a tie down strap for coupling said side panels together when said panels are in said retracted position, said tie down strap having opposite ends, one of said ends having a resiliently deformable J-shaped clip being pivotally coupled to one of said horizontal members of one of said side panels, another of said ends having a U-shaped clip being coupleable to one of said horizontal members of another of said side panels.

16. A collapsible storage system for use in a vehicle comprising, in combination:

a seat adapted for mounting in a vehicle and having a sitting portion and a back portion being pivotally coupled to said seat portion;

said back portion of said seat being positionable between an upright and a down position, said back portion being aligned generally perpendicular said sitting portion when said back portion is in said upright position, said back portion being aligned generally parallel said sitting portion when said back portion is in said down position;

a storage receptacle having opposite side panels and a pair of end panels extending between said side panels, lower edges of each of said side and end panels of said storage receptacle being pivotally coupled to a rear surface of said back portion of said seat;

each of said side and end panels of said storage receptacle being generally rectangular;

said side and end panels of said storage receptacle being positionable between a deployed position and a retracted position, said panels being oriented substantially perpendicular said rear surface of said back portion of said seat when said panels are in said deployed position, said panels being oriented substantially parallel said rear surface of said back portion of said seat when said panels are in said deployed position;

each of said side and end panels of said storage receptacle having a peripheral ring extending therearound and a plurality of elongate horizontal and vertical cross members extending across said peripheral ring;

wherein said cross members and said peripheral ring of said side and end panels each have a generally circular transverse cross section taken perpendicular to longitudinal axes thereof;

said storage receptacle having a bottom tray, said bottom tray having an outer periphery, said outer periphery of said bottom tray being disposed between said panels of said storage receptacle and said seat;

said bottom tray of said storage receptacle having a peripheral lip outwardly extending from said outer periphery of said bottom tray;

said bottom tray of said storage receptacle having a plurality of elongate slots extending therethrough, said slots being positioned towards and oriented generally parallel said outer periphery of said bottom tray;

a plurality of straps for coupling said panels of said storage receptacle to said seat, each of said straps having opposite first and second ends, said first end of each of said straps being looped around one of said peripheral rings of said panels of said storage receptacle and through said one of slots of said bottom tray, said second end of each of said straps having a female portion of a snap type fastener coupled thereto;

said rear surface of said back portion of said seat having a plurality of male portions of snap type fasteners, said male portions of snap type fasteners of said seat being insertable in said female portions of said snap type fasteners of said straps for releasably coupling said straps to said seat;

each of said straps being deformable;

a plurality of resiliently deformable spring clips for coupling said panels together when said panels are in said deployed position;

wherein, each of said peripheral rings of said side panels of said storage receptacle has four spring clips pivotally coupled thereto;

said end panels being positioned between said side panels and said seat when said panels are in said retracted position;

a tie down strap for coupling said side panels of said storage receptacle together when said panels are in said retracted position;

said tie down strap having opposite ends, one of said ends having a resiliently deformable J-shaped clip being pivotally coupled to one of said horizontal members of one of said side panels, another of said ends having a Ushaped clip being coupleable to one of said horizontal members of another of said side panels;

said tie down strap being resiliently deformable between said ends of said tie down strap; and said J-shaped clip of said tie down strap being frictionally coupled to said horizontal member of said side panel.

* * * * *